(12) United States Patent
Forte et al.

(10) Patent No.: US 12,424,959 B2
(45) Date of Patent: Sep. 23, 2025

(54) ELECTRIC MOTOR

(71) Applicant: ELDOR CORPORATION S.P.A., Orsenigo (IT)

(72) Inventors: Pasquale Forte, Castiglione d'Orcia (IT); Michele Roman, Noventa di Piave (IT); Luca Zai, Turin (IT); Ruggero Seccia, Turin (IT)

(73) Assignee: ELDOR CORPORATION S.P.A., Orsenigo (IT)

( * ) Notice: Subject to any disclaimer, the term of this patent is extended or adjusted under 35 U.S.C. 154(b) by 164 days.

(21) Appl. No.: 18/006,320

(22) PCT Filed: Jul. 22, 2021

(86) PCT No.: PCT/IB2021/056618
§ 371 (c)(1),
(2) Date: Jan. 20, 2023

(87) PCT Pub. No.: WO2022/018675
PCT Pub. Date: Jan. 27, 2022

(65) Prior Publication Data
US 2023/0299631 A1  Sep. 21, 2023

(30) Foreign Application Priority Data
Jul. 22, 2020 (IT) .................... 102020000017770

(51) Int. Cl.
*H02P 1/32* (2006.01)
*H02P 25/18* (2006.01)

(52) U.S. Cl.
CPC .......... *H02P 25/188* (2013.01); *H02P 25/184* (2013.01)

(58) Field of Classification Search
CPC ....... H02P 25/188; H02P 25/184; H02P 25/22
See application file for complete search history.

(56) References Cited

U.S. PATENT DOCUMENTS

| 2017/0229993 A1 | 8/2017 | Obry et al. |
| 2020/0059189 A1 | 2/2020 | Ohashi |

FOREIGN PATENT DOCUMENTS

| CN | 2084247 U | * | 9/1991 | |
| EP | 1619787 A3 | | 4/2009 | |
| WO | 2013155601 A1 | | 10/2013 | |
| WO | WO-2018173424 A1 | * | 9/2018 | ........... B62D 5/0424 |

OTHER PUBLICATIONS

International Search Report and Written Opinion dated Nov. 5, 2021 from counterpart International Patent Application No. PCT/IB2021/056618.

* cited by examiner

*Primary Examiner* — Karen Masih
(74) *Attorney, Agent, or Firm* — SHUTTLEWORTH & INGERSOLL, PLC; Timothy J. Klima

(57) ABSTRACT

An electric motor includes a plurality of phases and a switching device. The phases extend between respective terminals and are divided into a plurality of distinct groups, in particular at least a first group and a second group. The switching device is coupled to the first group and is operable to switch an electrical configuration thereof. The second group of phases is instead configured to maintain its electrical configuration unchanged during the switching of the electrical configuration of the first group.

6 Claims, 2 Drawing Sheets

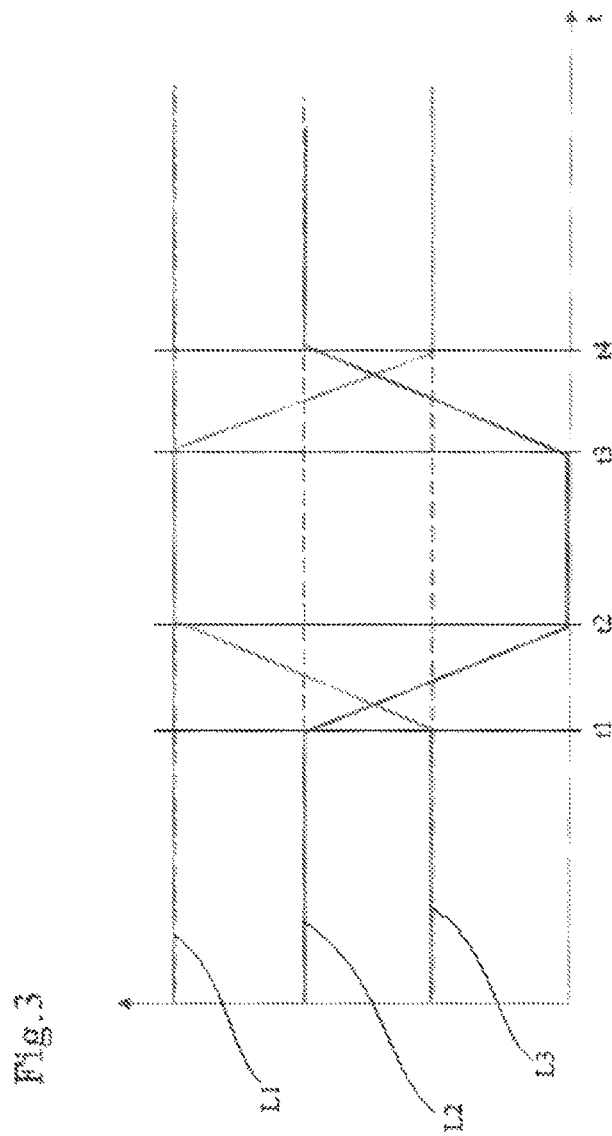

ELECTRIC MOTOR

This application is the National Phase of International Application PCT/IB2021/056618 filed Jul. 22, 2021 which designated the U.S.

This application claims priority to Italian Patent Application No. 102020000017770 filed Jul. 22, 2020, which applications are incorporated by reference herein.

The present invention relates to an electric motor.

The present invention therefore applies particularly to the automotive sector, for example in the design and manufacture of vehicles with electric or endothermic-electric hybrid propulsion.

In this industry, there has long been a desire to extend the range of efficiency of the electric motor in order to allow its use even in the absence of a mechanical transmission, or in any case in the presence of a simplified mechanical transmission.

Some methods are known today, suitable for traction applications, which exploit a suitable subdivision of the stator winding into different sections that can be selectively combined with each other in order to vary the motor "configuration", thus being able to adapt it to a multitude of operating conditions and extend its working range.

One such solution, perhaps the first, was studied by Eckart Nipp in his 1999 doctoral thesis, in which he described a reconfigurable electrical machine capable of achieving good performance under various operating conditions.

This solution, illustrated only on paper, has found limited application on the market, mainly due to its implementation/construction difficulties.

Up to now, in fact, E. Nipp's idea has been developed and realized by equipping the motors with complex wiring, relays and/or solid-state devices, the main drawbacks of which are pacifically identified in the overall dimensions, costs and, in the case of solid-state devices, in the losses they introduce in the system.

For example, document WO2018/087689 shows a reconfigurable electrical machine in which the winding of each stator phase comprises a plurality of coils connected to each other by means of a series of switches which, suitably controlled, may result in a series or parallel connection between the coils.

Over time, alternative solutions have been developed that allow for a significant simplification of the overall structure of the switching devices responsible for carrying out the change in configuration of the windings.

However, the very operation of changing the configuration of the connections between the windings is also affected by drawbacks which can create inconvenience to the user during operation of the motor.

In particular, during the change of configuration there is inevitably a transient in which the motor is in an intermediate situation between two possible distinct configurations, in which therefore no winding is connected, thus causing a momentary zeroing of the torque supplied by the motor.

This phenomenon, known as the "torque hole", typically lasts for a few tenths of a second, but even though it is brief it can still be perceived by the user of the vehicle, affecting the driving experience.

In this context, the technical task underlying the present invention is to propose an electric motor that overcomes at least some of the drawbacks of the prior art mentioned above.

In particular, the purpose of the present invention is to provide an electric motor capable of reducing, even eliminating, the phenomenon of torque loss, especially during possible changes of configuration of the windings of the motor itself.

The technical task and purposes specified can be substantially achieved by an electric motor comprising the technical specifications set out in one or more of the appended claims.

According to the present invention, an electric motor comprising a plurality of phases and a switching device is shown.

The phases extend between respective terminals and are divided into a plurality of distinct groups of phases, in particular a first group and at least a second group of phases.

The switching device is coupled to the first group of phases and can be activated to switch an electrical configuration, varying the electrical connections between its terminals.

Instead, the at least second group is configured to maintain its electrical configuration during the switching of the electrical configuration of the first group.

According to the spirit of the present invention, the plurality of phases may be divided into a plurality of distinct groups in which at least one group of phases, potentially each group, is associated with a respective switching device.

In accordance with this aspect, during the activation of the at least one switching device and until the end of the configuration change operation there is always at least one group of phases which maintains its configuration unchanged.

Advantageously, in this way during the configuration change operation, the torque hole effect can be reduced, even eliminated, since there is always at least one group of phases that continues to operate, supplying torque, which therefore does not zero during such a configuration change.

Preferably, during the activation of at least one switching device on the respective group of phases, at least one different group of phases is overloaded, so as to compensate for the loss of torque occurring during the configuration change operation.

The dependent claims, incorporated herein for reference, correspond to different embodiments of the invention.

Additional features and advantages of the present invention will be clearer from the indicative and therefore non-limiting description of a preferred but not exclusive embodiment of an electric motor, as illustrated in the appended drawings wherein:

FIG. 3 shows a graph representing the operation of the electric motor while performing a configuration change operation.

Figure 1:
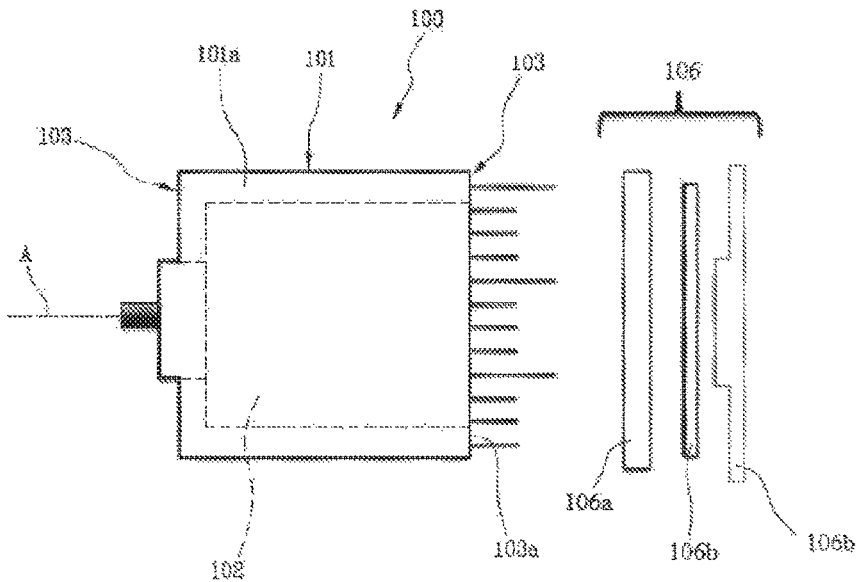
FIG. 1 shows an exploded schematic view of an electric motor provided with a switching device according to the present invention.

In the appended drawings, reference numeral 100 globally denotes an electric motor, to which reference will be made hereinafter in the description simply as motor 100.

As illustrated in FIG. 1, the motor 100 comprises a stator body, or stator 101, and a rotor body, or rotor 102, rotatably associated with the stator 101 to rotate about its own axis of rotation "A".

Note that the stator body 101 is preferably housed inside a containment body or casing.

The rotor 102 is preferably inserted into the stator 101 coaxially therewith, at least to the stator cavity, and comprises a plurality of magnets, electromagnets or windings operable to generate a magnetic field.

The stator 101, in turn, is provided with a prismatic casing 101a which extends along the axis of rotation "A" between two end faces 103.

Said casing 101a contains a plurality of angularly spaced phases defined by respective windings.

The phases may be of various kinds, but preferably they are defined by bar conductors suitably arranged in corresponding slots made in the casing and electrically connected to each other on at least one free end (i.e., at an end face 103a of the casing 101a).

The electric motor 100 is therefore of the multiphase type, i.e., comprising a number of phases ranging from two to more depending on the type or application.

In the preferred embodiment, however, the electric motor 100 is at least a three-phase motor.

Each phase extends between respective terminals which are defined by coils or, preferably, bars (or sets of bars/hairpins) connected to each other.

According to the invention, the plurality of phases comprised in the electric motor is divided into a plurality of distinct groups, preferably a first group 104 and at least a second group 105.

In particular, at least the terminals of the phases forming the first group 104 can be connected to each other in a plurality of different configurations in order to vary the operational configuration of the electric motor 100.

Structurally, each group 104, 105 of phases is evenly distributed on the stator 101, i.e., the phases are angularly spaced on the stator 101 such that each defines and extends for an entire circumference.

Such a feature advantageously allows the electric motor 100 to be maintained in stable operating conditions even and especially if one or more of said groups of phases has to be temporarily deactivated/disabled, for example during the operation of changing the configuration of the electric motor 100.

Specifically, to perform such an operation, the motor 100 further comprises a switching device 106 coupled to the first group 104 and operable to switch an electrical configuration thereof, varying the electrical connections between the terminals of the phases of the first group.

In detail, the expression "activation of the switching device 106" is understood to mean by extension the entire set of operations needed to perform switching of the electrical configuration of the first group 104.

According to a possible aspect of the present invention, the switching device 106 is realized by means of a fixed body 106a and a movable body 106b.

The fixed body 106a is provided with a plurality of connection portions that can be associated with respective terminals of the various phases comprising the first group 104 and is preferably made of aluminium.

Such connection portions may be realized, for example, by means of conductive pins protruding from the fixed body 106a and such as to define an electrical connection element for the respective phase.

In particular, each conductive pin contributes to defining a respective terminal of a respective phase.

In a preferred embodiment, the fixed body 106a is made by means of a ring or disc abutted to the end face 103a of the casing 101a.

Alternatively, the fixed body 106a could be made in one piece (i.e., integrally, e.g., by moulding or die casting) with the body "C" containing the electric motor 100.

The movable body 106b is instead selectively movable with respect to the fixed body 106a between a plurality of positions in which it engages the conductive pins according to different configurations, thereby varying the electrical connections established between the various terminals of the phases forming the first group 104.

To such purpose, the movable body 106b comprises a plurality of contact portions each associated with a respective terminal and provided with at least a first and a second connection point separate from each other and positioned such that the first point contacts the respective terminal when the movable body is in a first position and the second point contacts the respective terminal when the movable body assumes a second position.

Preferably, the contact portions are shaped as slots oriented in a direction of movement of the movable body 106b in which terminals of the phases of the first group 104.

Preferably, the first movable body 106b is rotatably associated with the fixed body 106a to rotate relative thereto between the first and second positions.

More precisely, the movable body 106b is rotatable around its own central axis between a first angular position and a second angular position corresponding to the first and second positions.

Preferably, the first movable body 106b is at least partially defined by a disc or ring coaxial to the fixed body 106a and abutted or facing thereon.

In the preferred embodiment, the fixed body 2 is axially interposed between the stator 101 and the movable body 106b; however, in alternative embodiments the positioning may be reversed or present a different arrangement (radial or otherwise).

Preferably, therefore, in such an embodiment, the fixed body 106b comprises a plurality of apertures (preferably axial apertures) shaped to allow the engagement of each free end of the windings defining the phases of the motor 100.

Operationally, the switching device 106 is configured to switch the electrical configuration of the respective group of phases between a series configuration and a parallel configuration and/or between a star configuration and a triangle configuration.

In other words, the switching device 106 is capable of modifying the electrical connections defined between the terminals of the various phases of the first group 104, switching them between distinct first and second configurations which may be, for example, selected from the following options: a star series configuration, a star-parallel configuration, a triangle-series configuration and a triangle-parallel configuration.

To this end, the switching device may comprise a movable body 106b active on the terminals of the respective group of phases to switch the connections between a series and parallel electrical configuration and/or a further movable body 106b active on the terminals of the respective group of phases to switch the connections between a star and a triangle electrical configuration.

According to a further aspect of the present invention, the switching device 106 may be implemented by means of a semiconductor device.

According to this aspect, the switching device 106 comprises at least one substrate (positively or negatively doped), a plurality of connection pairs, and a plurality of driver electrodes.

Each connection pair may be provided with a plurality of connection electrodes connectable (in use connected) to respective phase terminals of the first group 104.

The driver electrodes are therefore operatively interposed between the connection electrodes and configured to generate respective conductive channels according to predefined patterns depending on the reception of predefined driving signals.

The specific activation pattern of the different conductive channels allows the various terminals to be electrically connected according to respective distinct electrical configurations (in particular according to the electrical configurations identified above).

During activation of the switching device 106 and throughout the duration of the configuration change operation in the electrical connections of the terminals of the first group 104, the second group 105 of phases is configured to maintain its own electrical configuration unaltered.

In other words, a situation in which the delivered torque becomes zero never occurs during use of the motor 100, since even during configuration change operations, i.e., during activation of the switching device 106, at least a portion of the motor phases is always present that continuously operate to contribute to the overall torque delivered by the motor 100, which therefore does not become zero even during such configuration change.

In this way, the undesired effects due to the torque hole phenomenon are attenuated, since the motor 100 can continue to supply torque at least partially, considerably reducing the user's perception of the configuration change operation.

In particular, the phases can be suitably grouped according to different configurations depending, for example, on the degree of attenuation to be obtained.

Figure 2:
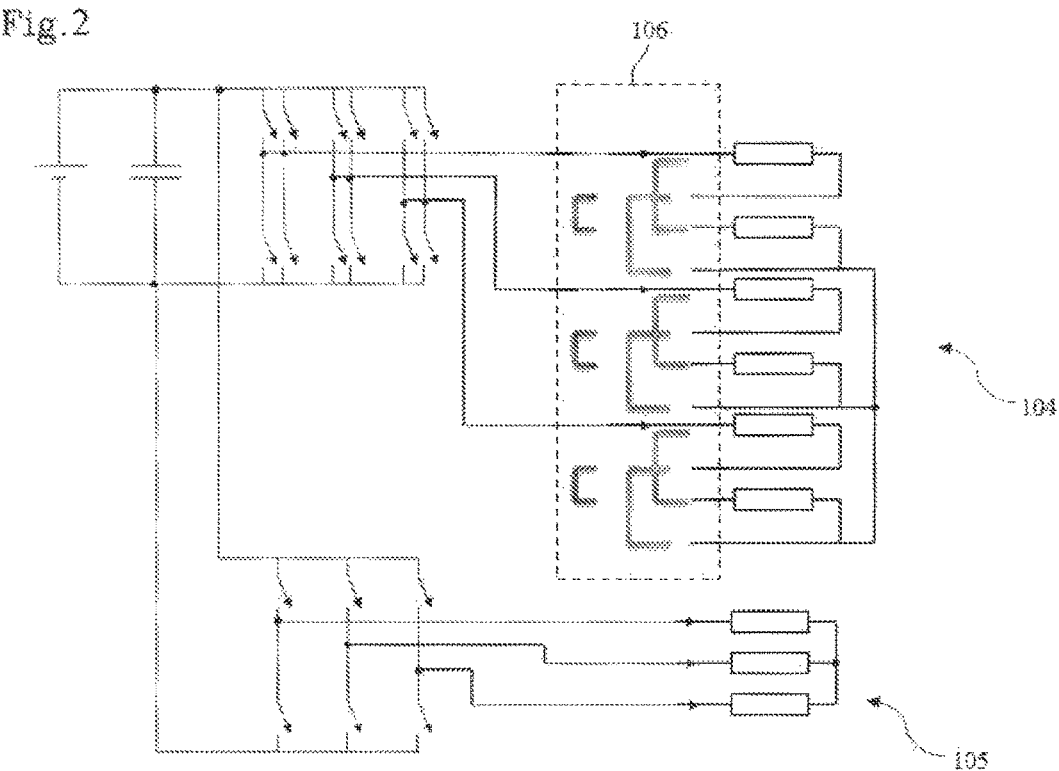
FIG. 2 shows a wiring diagram representative of a preferred embodiment of the electric motor of FIG. 1.

By way of example, FIG. 2 shows a circuit diagram in which the phases are subdivided in such a way that the first group 104 is responsible for delivering substantially about ⅔ of the total torque deliverable by the motor 100, while the single second group 106 present in the case illustrated delivers the remaining ⅓.

Consequently, during the activation of the switching device 106, the contribution generated by the first group 104 is zeroed, while the contribution provided by the second group 105 remains constant, and therefore the motor 100 always continues to provide at least ⅓ of the total deliverable torque.

In other words, the motor 100 is capable of delivering, albeit partially, torque even and especially while the electrical contacts between the terminals of the first group 104 are reconfigured.

As is illustrated by way of example in FIG. 2, the second group 105 may comprise phases having a single possible fixed electrical configuration that cannot be varied.

In other words, the terminals of the second group 105 of phases may be connected in a predefined fixed electrical configuration that cannot be changed.

In particular, in the predefined fixed configuration, the second group 105 of phases connects an equally fixed and predefined number of conductive elements.

The term "conductive elements" is used to define and include alternatively coils or conductors, depending on whether the phases of the electric motor are obtained by means of a wire or a plate structure.

In this context, the first group 104 of phases instead connects a different number of conductive elements depending on the configuration assumed under the action of the switching device 106.

In particular, the first group 104 can be switched between a first electrical configuration in which it connects a first number of conductive elements and a second electrical configuration in which it connects a second number of conductive elements, different from the first number.

Operationally, the first number of conductive elements is proportional to the predefined fixed number of conductive elements while the second number of conductive elements is equal to the predefined fixed number of conductive elements.

In other words, when the first group 104 is switched into the second configuration it connects a number of conductive elements equivalent to the number of conductive elements connected by the second group 105.

Specifically, the second configuration is assumed when the electric motor 100 must operate at high speed, i.e., to achieve a speed greater than a predefined reference value, while the first configuration is assumed to operate at low speed, i.e., below the reference value.

In particular, reference is made to a speed attainable by a vehicle (e.g., an electrically driven or hybrid vehicle) on which the present electric motor 100 is installed.

In this way, when the electric motor 100 operates to reach higher speeds, the number of conductive elements associated with each group of phases 104, 105 is identical, ensuring greater stability and control of the operation of the electric motor 100 itself, even and in particular when this aspect is more critical.

Alternatively, according to a further aspect of the present invention, the motor 100 may comprise a further switching device 106 coupled to the second group 105 and configured to switch an electrical configuration of said second group 105 by varying the electrical connections existing between its terminals.

In general, from a functional point of view, the switching device 106 which is applied to the second group 105 (equivalently identifiable also as a further switching device 106) is equivalent and identical to that applied to the first group 104, while remaining separate and distinct with respect to the latter.

In addition, the switching device 106 applied to the second group 105 may also be structurally identical to the switching device applied to the first group 104, or be structurally different in construction.

In general, while functionally equivalent, each switching device 106 may preferably be implemented according to one of the two distinct options described above regardless of the specific structural conformation of each other switching device 106 installed in the motor 100.

Operationally, the activation of the individual switching devices 106 is independent, i.e., each of them may be selectively activated/deactivated independently of the activation/deactivation status of each of the other switching devices included in the motor 100.

Furthermore, during activation of a switching device 106, whether associated with the first group 104 or the second group 105, each other switching device 106 is disabled.

In other words, during the execution of a configuration change there is always at least one switching device 106 present which is inactive and therefore the configuration of the group of phases with which it is associated is maintained unchanged.

In this way, there is always at least one group of phases operating and normally active so as to allow the motor 100 to deliver at least a fraction of the total torque it is capable of generating even when the electrical contacts between the terminals of the one or more specific groups of phases are reconfigured.

This expedient provides a motor 100 which fully exploits the advantages deriving from the possibility of recombining the stator windings, since it is possible to modify the configuration of the electrical contacts of all the phases constituting the motor 100, at the same time reducing the torque hole phenomenon.

Structurally, the motor 100 may comprise a plurality of second groups 105 and a plurality of switching devices 106 each of which is coupled to a respective second group 105.

In detail, the number of switching devices 106 may be equivalent to the number of group of phases comprising the motor 100, i.e., each second group 105 may be coupled to a respective switching device.

The motor 100 may therefore comprise a plurality of second groups of phases 105 of which none, one, more than one or all are coupled to a respective switching device 106.

As already pointed out, the motor 100 is configured to operate in such a way that during the activation of at least one switching device 106 there is at least one group of phases present that maintains its configuration unaltered in such a way as to attenuate, or as will be further discussed below, eliminate, the torque hole phenomenon.

In particular, the selection of the specific groups of phases to be switched and to be kept stable is operated in such a way as to maximize the efficiency of the motor 100 while minimizing the loss of torque resulting from the change of configuration.

For example, in an embodiment in which there are a plurality of second groups 105 each of which is associated with a respective switching device 106, it is possible to carry out a sequential configuration change in which the switching devices 106 are activated only one at a time in such a way as to minimize the perception of the entire operation since at each instant there will only be a loss of torque equal to the contribution made by the single group of phases on which the configuration change is being carried out.

Alternatively, it is possible to activate all but one of the switching devices 106 at the same time in order to maximize the speed of configuration changeover of the various groups of phases.

Intermediate solutions make it possible to achieve a balance between the speed of the overall configuration change and the perception of this operation by a user, as required.

The motor 100 may further comprise a configured control unit that supervises the operation of the motor 100, in particular with respect to supplying the electrical power required to generate the torque.

During the operation of the motor, the control unit is configured to supply, even overload, at least one group of phases simultaneously with the activation of a switching device 106 coupled to a different group of phases.

In this way, the overloaded group of phases will be able to contribute more to the torque generated by the motor 100, making up for the loss arising during the execution of the configuration change operated on a different group.

In other words, the control unit supplies at least one group of phases in such a way as to minimize performance variations of the motor 100 in particular with respect to the torque delivered during switching of a further group of phases.

This compensation allows the effects of torque holes to be attenuated or eliminated.

Structurally, the motor 100 therefore comprises a plurality of power supply devices (e.g., inverters) each coupled to a respective group of phases to allow it to deliver electrical power autonomously and independently.

In detail, the control unit is configured to measure at least one performance parameter of the motor 100, such as, for example, the delivered torque, and to drive the electrical power supply of at least one group of phases in such a way as to compensate for variations in said performance parameter, preferably keeping it constant, during the entire switching of electrical configuration of a different group of phases.

In other words, the control unit monitors the performance of the motor 100 during the change of configuration of the at least one group of phases and drives the electrical power supply of the at least one further group of phases, up to even bringing it into an overload condition, so that it contributes to the performance of the motor 100 up to possibly the point of completely equalizing the contribution up to that instant provided by the group that is changing configuration, thus keeping constant in particular the torque provided by the motor 100 during the entire switching operation.

A possible example of a procedure for checking the performance of the motor 100 is illustrated in FIG. 3, where "L1" indicates the total torque delivered by the motor 100.

As can be seen, the overall torque "L1" is the resultant of the contributions arising from the torque generated by a first group 104 and indicated as "L2" added to the contribution generated by a second group indicated as "L3".

At time "t1", the procedure for changing the configuration of the existing electrical connections between the terminals of the first group 104 is activated.

This operation starts by progressively reducing the electrical power supplied to the first group 104 causing consequently the reduction of the torque supplied by it as shown in the figure.

At the same time, the control unit controls the power supply device associated with the second group 105, increasing the power output and consequently causing an increase in the torque generated and delivered by said second group 105.

Accordingly, the second group 105 compensates for the losses due to the lower contribution of the first group 104 allowing the overall torque "L1" to remain constant.

Between times "t2" and "t3", the contribution resulting from the first group 104 is zeroed and the movable body 106b of the switching device 106 is moved to modify the existing electrical connections between the terminals of the first group 104.

At this point, it is possible to reactivate the electrical power supply to the first group 104 while simultaneously reducing the degree of overload of the second group 105 until it returns to full operation at time "t4".

Advantageously, the present invention achieves the proposed purposes, overcoming the drawbacks complained of in the prior art by providing the user with an electric motor 100 that mitigates, up to eliminating, the torque hole phenomenon resulting from a change in the electrical configuration of the windings comprising the motor 100 itself.

The invention claimed is:

1. An electric motor comprising:
a plurality of phases extending between respective terminals and divided into a plurality of distinct groups of phases;
a switching device which is coupled to a first group of the groups of phases and is activatable to switch an electrical configuration of said first group by changing electrical connections between the terminals of the phases of the first group;
wherein said plurality of phases comprises at least a second group of the groups of phases configured to maintain an electrical configuration thereof during the switching of the electrical configuration of the first group, the terminals of said second group being connected in a predefined fixed electrical configuration.

2. The electric motor according to claim 1, wherein the switching device is configured to switch the electrical configuration of a respective one of the groups of phases between a first configuration and a second configuration, said first and second configurations being selected at least from: a star-series configuration, a star-parallel configuration, a triangle-series configuration and a triangle-parallel configuration.

3. The electric motor according to claim 1, and further comprising a plurality of power supply devices, each of the power supply devices being configured to deliver electrical power to a respective one of the groups of phases.

4. The electric motor according to claim 1, and further comprising a stator, wherein the phases of each of the groups of phases are angularly distributed on said stator such that each of the groups of phases extends over an entire circumference of the stator.

5. The electric motor according to claim 2, wherein the second group connects, for each of the phases, a fixed predefined number of conductive elements and the first group is switchable between a first electrical configuration connecting for each of the phases a first number of conductive elements and a second electrical configuration connecting for each of the phases a second number of conductive elements and in which the second number of conductive elements is equal to a number of conductive elements of the predefined fixed electrical configuration.

6. The electric motor according to claim 5, wherein the second electrical configuration is a high-speed configuration assumable by the electric motor to achieve a speed greater than a predefined reference value.

* * * * *